United States Patent
Kanamori

(10) Patent No.: US 11,997,164 B2
(45) Date of Patent: May 28, 2024

(54) VEHICLE CONTROL SYSTEM

(71) Applicant: DENSO CORPORATION, Kariya (JP)

(72) Inventor: Motoki Kanamori, Kariya (JP)

(73) Assignee: DENSO CORPORATION, Kariya (JP)

( * ) Notice: Subject to any disclaimer, the term of this patent is extended or adjusted under 35 U.S.C. 154(b) by 578 days.

(21) Appl. No.: 17/184,024

(22) Filed: Feb. 24, 2021

(65) Prior Publication Data

US 2021/0218813 A1 Jul. 15, 2021

Related U.S. Application Data

(63) Continuation of application No. PCT/JP2019/034774, filed on Sep. 4, 2019.

(30) Foreign Application Priority Data

Sep. 6, 2018 (JP) .................. 2018-166907
May 28, 2019 (JP) .................. 2019-099326

(51) Int. Cl.
*H04L 67/12* (2022.01)
*B60R 16/023* (2006.01)
*H04L 12/40* (2006.01)

(52) U.S. Cl.
CPC ............ *H04L 67/12* (2013.01); *B60R 16/023* (2013.01); *H04L 12/40* (2013.01); *H04L 2012/40273* (2013.01)

(58) Field of Classification Search
CPC ...... H04L 67/12; H04L 12/40; H04L 2012/40273; B60R 16/023

See application file for complete search history.

(56) References Cited

U.S. PATENT DOCUMENTS

| | | | |
|---|---|---|---|
| 2008/0155551 A1 | 6/2008 | Yoshida et al. | |
| 2009/0089627 A1 | 4/2009 | Matsubara et al. | |
| 2014/0129047 A1* | 5/2014 | Barrett | H04W 4/44 701/1 |
| 2017/0352198 A1 | 12/2017 | Hasegawa et al. | |
| 2018/0239896 A1 | 8/2018 | Kato et al. | |
| 2019/0068718 A1* | 2/2019 | Lee | H04W 4/40 |

(Continued)

FOREIGN PATENT DOCUMENTS

| | | |
|---|---|---|
| DE | 102017208532 A1 | 12/2017 |
| DE | 112018002769 T5 | 2/2020 |
| JP | 2008158921 A | 7/2008 |

(Continued)

*Primary Examiner* — Bryan Y Lee
(74) *Attorney, Agent, or Firm* — Harness, Dickey & Pierce, P.L.C.

(57) ABSTRACT

A vehicle control system includes a first electronic control apparatus and a second electronic control apparatus. The first electronic control apparatus includes a first controller, a first communication circuit, and a housing. The first controller is configured to execute a first operating system that operates a first application. The housing is configured to contain the first controller and the first communication circuit. The second electronic control apparatus includes a second controller and a second communication circuit. The second controller is configured to execute a second operating system that operates a second application. The second communication circuit is configured to perform data communication with the first communication circuit.

5 Claims, 9 Drawing Sheets

(56) References Cited

U.S. PATENT DOCUMENTS

2020/0005829 A1    1/2020   Hasegawa et al.
2020/0274883 A1*   8/2020   Ujiie ........................ H04L 63/08

FOREIGN PATENT DOCUMENTS

| JP | 2009081750 A | 4/2009 |
|----|--------------|--------|
| JP | 2011014033 A | 1/2011 |
| JP | 2011076972 A | 4/2011 |
| JP | 2012068207 A | 4/2012 |
| JP | 2012108787 A | 6/2012 |
| JP | 6130617 B1   | 5/2017 |

* cited by examiner

VEHICLE CONTROL SYSTEM

CROSS REFERENCE TO RELATED APPLICATIONS

The present application is a continuation application of International Patent Application No. PCT/JP2019/034774 filed on Sep. 4, 2019, which designated the U.S. and claims the benefit of priority from Japanese Patent Application No. 2018-166907 filed on Sep. 6, 2018, and Japanese Patent Application No. 2019-99326 field on May 28, 2019. The entire disclosures of all of the above applications are incorporated herein by reference.

TECHNICAL FIELD

The present disclosure relates to a vehicle control system that controls a vehicle.

BACKGROUND

There is a computer system incorporated in an automobile or the like. In human machine interface control apparatuses that control a display device installed in the cockpit of a vehicle, the operating system used in the mobile terminal (hereinafter referred to as the OS for mobile terminals) is rapidly becoming widespread. The OS for mobile terminals is often updated every year, and this update expands the functions installed in the OS for mobile terminals. For this reason, the functions of applications installed in the OS for mobile terminals are also increasing, and it is necessary to improve the performance of the hardware installed in the mobile terminals accordingly.

SUMMARY

According to an example of the present disclosure, a vehicle control system is provided to include a first electronic control apparatus and a second electronic control apparatus, which are mounted on a vehicle.

The first electronic control apparatus includes a first controller, a first communication circuit, and a housing. The first controller is configured to execute a first operating system that operates a first application. The housing is configured to contain the first controller and the first communication circuit.

The second electronic control apparatus includes a second controller and a second communication circuit. The second controller is configured to execute a second operating system that operates a second application. The second communication circuit is configured to perform data communication with the first communication circuit.

BRIEF DESCRIPTION OF THE DRAWINGS

The objects, features, and advantages of the present disclosure will become more apparent from the following detailed description made with reference to the accompanying drawings. In the drawings.

DETAILED DESCRIPTION

First Embodiment

Hereinafter, a first embodiment of the present disclosure will be described with reference to the drawings.

Figure 1:
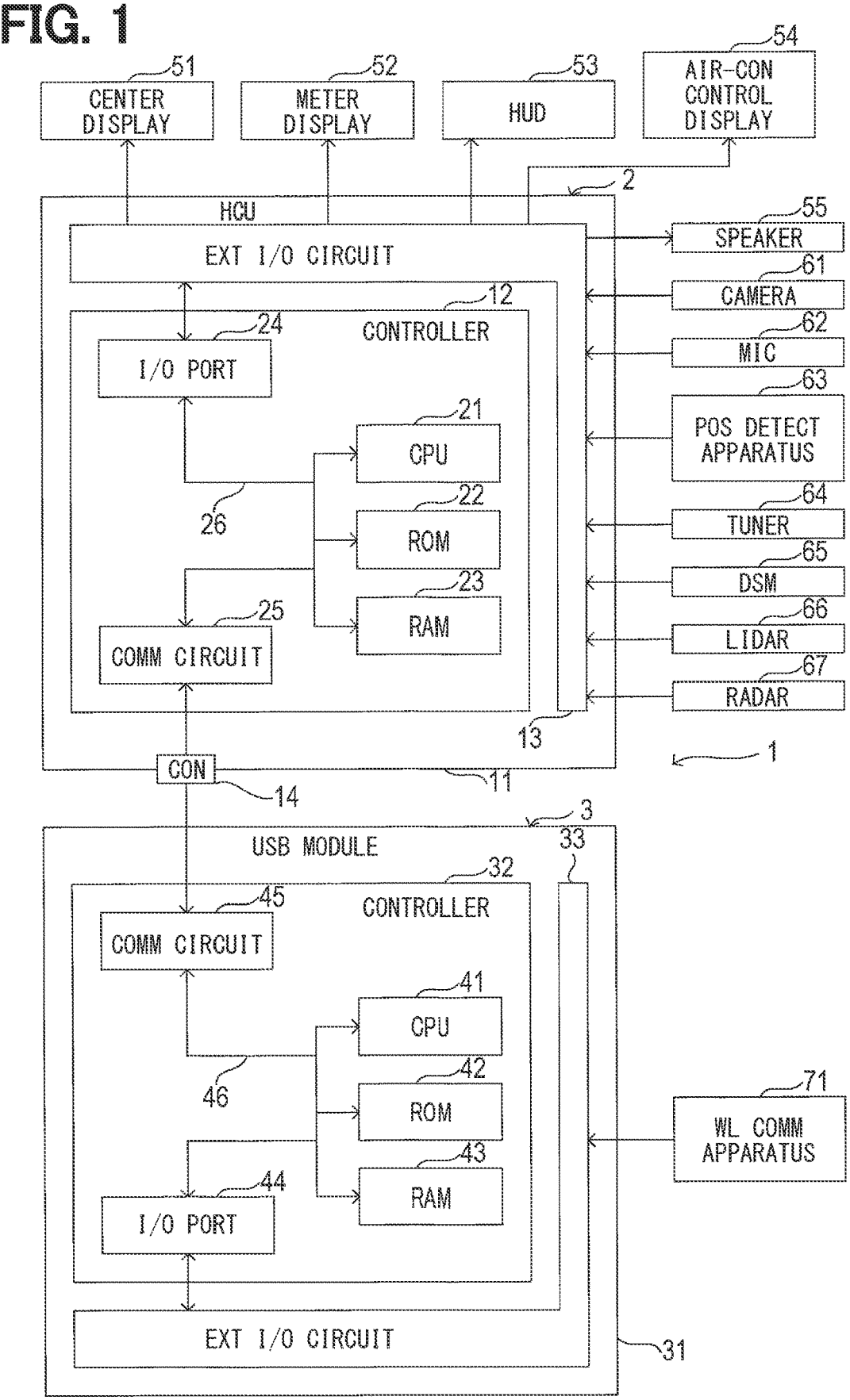
FIG. 1 is a block diagram showing a configuration of a vehicle control system according to first to fourth embodiments.

A vehicle control system 1 according to a first embodiment is mounted on a vehicle and includes a human-machine interface control unit 2 (hereinafter, HCU 2) and a USB module 3 as shown in FIG. 1. HCU is an abbreviation for Human Machine Interface control unit. USB is an abbreviation for Universal Serial Bus.

The HCU 2 is a semiconductor integrated circuit composed of, for example, an SoC. The HCU 2 includes a housing 11, a controller unit 12, and an external input/output circuit 13 for providing signal input/output between the controller unit 12 and an outside of the HCU 2. SoC is an abbreviation for System on a Chip.

The housing 11 is a metal member formed in a box shape, and contains the controller unit 12 and the external input/output circuit 13 inside.

The controller unit 12 includes a CPU 21, a ROM 22, a RAM 23, an input/output port 24, a communication circuit 25, and a bus line 26 that connects the foregoing components to each other.

The CPU 21 executes various processes for controlling the HCU 2 based on the program stored in the ROM 22. The ROM 22 is a non-volatile memory, and stores a program executed by the CPU 21 and data referred to when the program is executed. The RAM 23 is a volatile memory and temporarily stores the calculation result of the CPU 21 and the like.

The input/output port 24 is a circuit for inputting/outputting a signal between the outside of the controller unit 12 and the controller unit 12. The communication circuit 25 transmits and receives data to and from a communication circuit connected via a USB connector 14 attached on the outer surface of the housing 11 by a method conforming to the USB standard.

Various functions of the controller unit 12 are implemented by the CPU 21 executing a program stored in a non-transitory tangible storage medium. In this example, the ROM 22 corresponds to a non-transitory tangible storage medium in which a program is stored. In addition, by executing this program, a method corresponding to the program is executed. Note that a part or all of the functions to be executed by the CPU 21 may be configured as hardware circuitry by one or multiple ICs or the like.

The USB module 3 is a semiconductor integrated circuit composed of, for example, an SoC. The USB module 3 includes a housing 31, a controller unit 32, and an external input/output circuit 33 for inputting/outputting signals between the outside of the USB module 3 and the controller unit 32.

The housing 31 is a metal member formed in a box shape, and houses the controller unit 32 and the external input/output circuit 33 inside.

The controller unit 32 includes a CPU 41, a ROM 42, a RAM 43, an input/output port 44, a communication circuit 45, and a bus line 46 that connects the foregoing components to each other.

The CPU 41 executes various processes for controlling the USB module 3 based on the program stored in the ROM 42. The ROM 42 is a non-volatile memory, and stores a program executed by the CPU 41 and data referred to when the program is executed. The RAM 43 is a volatile memory and temporarily stores the calculation result of the CPU 41 and the like.

The CPU 41 has higher processing performance than the CPU 21. That is, when the CPU 21 and the CPU 41 execute the same calculation process, the CPU 41 can complete the calculation process in a shorter time than the CPU 21.

The input/output port 44 is a circuit for inputting/outputting a signal between the outside of the controller unit 32 and the controller unit 32. The communication circuit 45 transmits and receives data to and from the communication circuit 25 connected via the USB connector 14 by, as a wired communication link, a method conforming to the USB standard.

Various functions of the controller unit 32 are implemented by executing a program stored in a non-transitory tangible storage medium by the CPU 14. In this example, the ROM 42 corresponds to a non-transitory tangible storage medium that stores a program. In addition, by executing this program, a method corresponding to the program is executed. Note that a part or all of the functions to be executed by the CPU 41 may be configured as hardware circuitry by one or multiple ICs or the like.

A center display 51, a meter display 52, a head-up display 53, an air conditioner controller display 54, and a speaker 55 are connected to the HCU 2.

The center display 51 is arranged in front of the driver's seat and the passenger's seat. The center display 51 is used as a display screen of various in-vehicle devices such as navigation and audio, and is also used as a display screen for applications. The meter display 52 is arranged in front of the steering wheel to display various meters and the like. The head-up display 53 displays various information on a windshield arranged in front of the driver. The air conditioner controller display 54 displays information (for example, the current set temperature, etc.) about the air conditioner controller that controls the in-vehicle air conditioner. The speaker 55 is installed in the vehicle interior and outputs the speech indicated by the speech data input from the HCU 2.

A camera 61, a microphone 62, a position detection apparatus 63, a tuner 64, a driver status monitor 65 (hereinafter, DSM 65), a LIDAR 66, and a radar 67 are connected to the HCU 2. DSM is an abbreviation for Driver Status Monitor. LIDAR is an abbreviation for Light Detection and Ranging.

The camera 61 is attached to the rear side of the vehicle, for example, and continuously captures images of the situation behind the vehicle. The microphone 62 is installed in the vehicle interior and inputs the speech spoken by the occupant of the vehicle. The microphone 62 outputs speech data indicating the input speech.

The position detection apparatus 63 includes a GPS receiver and a gyro sensor. GPS is an abbreviation for Global Positioning System. The GPS receiver receives the GPS positioning signals transmitted from the GPS satellites and outputs the received GPS positioning signals. The gyro sensor detects the angular velocity of rotation about the X-axis, Y-axis, and Z-axis that are orthogonal to each other.

The tuner 64 receives radio broadcast signals of AM broadcast and FM broadcast. The DSM 65 detects the driver's status by image analysis of a facial image of the driver's face. The LIDAR 66 detects the position of an object existing around the vehicle by transmitting and receiving laser light. The radar 67 detects the position of an object existing around the vehicle by transmitting and receiving a radar wave in the millimeter wave band.

A wireless communication apparatus 71 is connected to the USB module 3. The wireless communication apparatus 71 includes a BT communication unit and a Wi-Fi communication unit. The BT communication unit performs short-range wireless communication by a method compliant with the Bluetooth standard. Bluetooth is a registered trade mark. The Wi-Fi communication unit performs short-range wireless communication by a method compliant with the Wi-Fi standard. Wi-Fi is a registered trademark.

Figure 2:
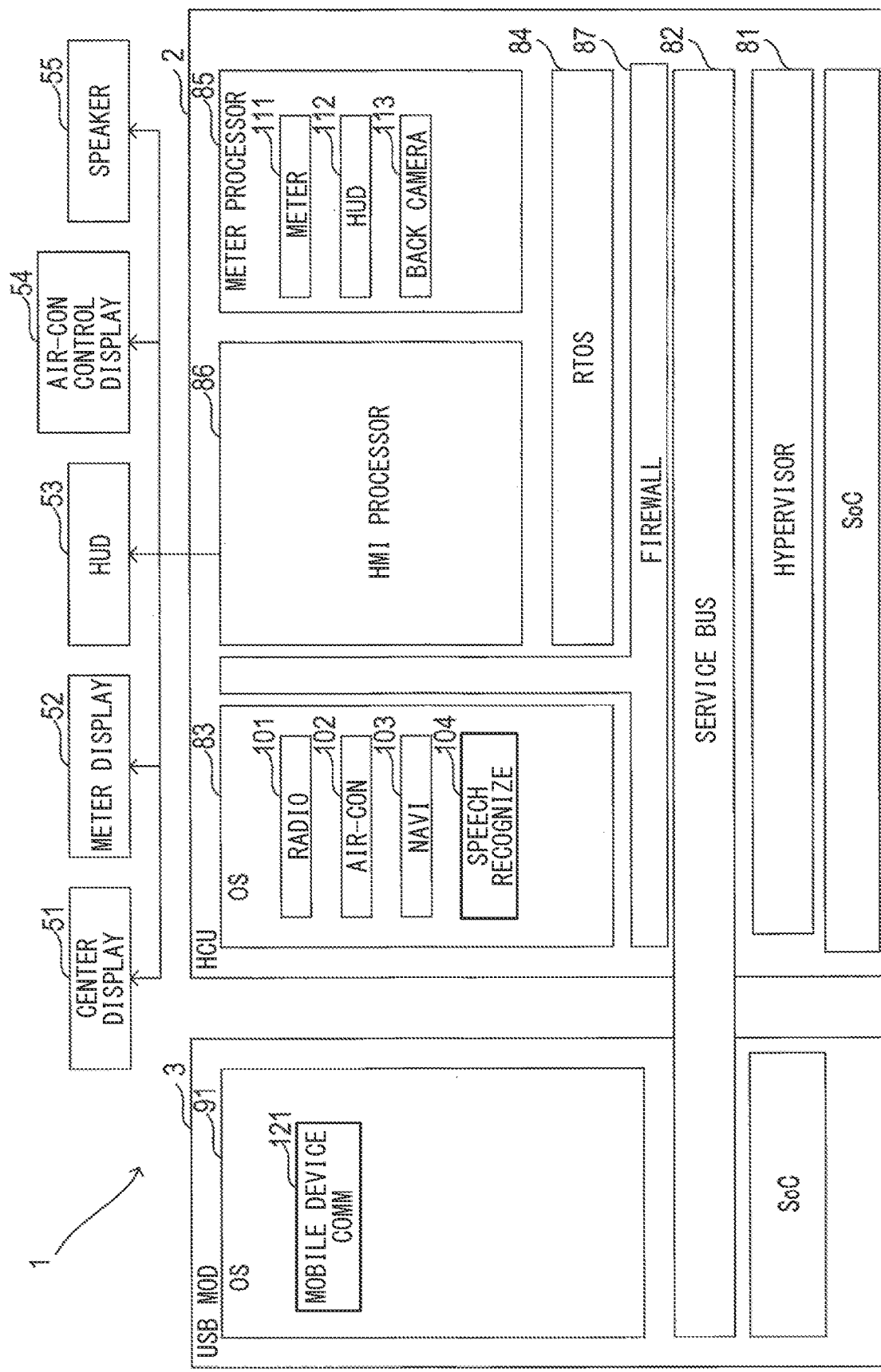
FIG. 2 is a functional block diagram showing a functional configuration of the vehicle control system according to the first to fourth embodiments.

As shown in FIG. 2, the HCU 2 includes a hypervisor 81, a service bus 82, an operating system 83 (hereinafter, OS 83), a real-time operating system 84 (hereinafter, real-time OS 84), a meter processor unit 85, an HMI processor unit 86, and a firewall 87, by using the tangible configuration shown in FIG. 1 and related software programs. OS is an abbreviation for Operating System. HMI is an abbreviation for Human Machine Interface.

The hypervisor 81 has a function of managing a plurality of operating systems so that the plurality of operating systems can be executed in parallel on the CPU 21. That is, the hypervisor 81 manages the OS 83 and the real-time OS 84.

The service bus 82 is an application that bridges data between (i) an application layer and (ii) a lower layer that is lower than the application layer (i.e., a presentation layer or a layer lower than the presentation layer). The service bus 82 exchanges data so that the HCU 2 and the USB module 3 that communicate with each other via the USB connector 14 can exchange data as if they were one device. Therefore, the service bus 82 includes a database for associating the data used in the application layer with the data used in the lower layer. The service bus 82 performs the data conversion between the application layer and the lower layer by referring this database.

The OS 83 is basic software installed in HCU 2 to operate various applications. In this embodiment, the OS 83 is Android. Android is a registered trademark.

In this embodiment, the OS 83 operates a radio application 101, an air conditioner application 102, a navigation application 103, and a speech recognition application 104.

The radio application 101 executes a process for outputting audio based on the radio broadcast signal received by the tuner 64. The air conditioner application 102 executes control of the air conditioner mounted on the vehicle.

The navigation application 103 executes a process for displaying the current location of the vehicle, a process for guiding a route from the current location to the destination, and the like based on the position information detected by the position detection apparatus 63.

The speech recognition application 104 executes a process for recognizing the speech detected by the microphone 62, a process for responding based on the recognition result, and the like.

The real-time OS 84 has a function of managing the HMI processor unit 86 and the meter processor unit 85 so that the HMI processor unit 86 and the meter processor unit 85 can be executed in parallel on the CPU 21. The real-time OS 84 manages the HMI processor unit 86 and the meter processor unit 85 so that the real-time performance of the processing by the HMI processor unit 86 and the meter processor unit 85 can be ensured.

The meter processor unit 85 operates the meter application 111, the head-up display application 112, and the back camera application 113.

The meter application 111 executes a process for controlling the display on the meter display 52. The head-up display application 112 executes a process for controlling the display by the head-up display 53. The back camera application 113 executes a process for controlling the display of the captured image by the camera 61.

The HMI processor unit 86 executes a process of controlling the displays by the center display 51, the meter display 52, the head-up display 53, and the air conditioner controller display 54 based on the video data input from the outside of the HMI processor unit 86. Further, the HMI processor unit 86 executes a process of controlling the speech output by the speaker 55 based on the speech data input from the outside of the HMI processor unit 86.

The firewall 87 restricts unauthorized access to the OS 83 from the outside of the OS 83. Further, the firewall 87 restricts unauthorized access to the real-time OS 84 from the outside of the real-time OS 84.

The USB module 3 includes an operating system 91 (hereinafter, OS 91). The OS 91 is basic software installed in the USB module 3 for operating various applications. In this embodiment, the OS 91 is Android. The OS 91 operates a mobile device communication application 121.

The mobile device communication application 121 executes a process of transmitting and receiving data to and from a mobile device by short-range wireless communication using the wireless communication apparatus 71, and transmitting the received data to the HCU 2.

Next, the procedure of the start-up process executed by HCU 2 will be described. The start-up process is a process that is started when a power supply voltage is applied to the HCU 2. Under the condition where the USB module 3 is connected with the HCU 2 via the USB connector 14, when the power supply voltage is applied to the HCU 2, the power supply voltage is also applied to the USB module 3 via the USB connector 14. As a result, the CPU 41 of the USB module 3 starts, and the CPU 41 starts the OS 91.

Figure 3:
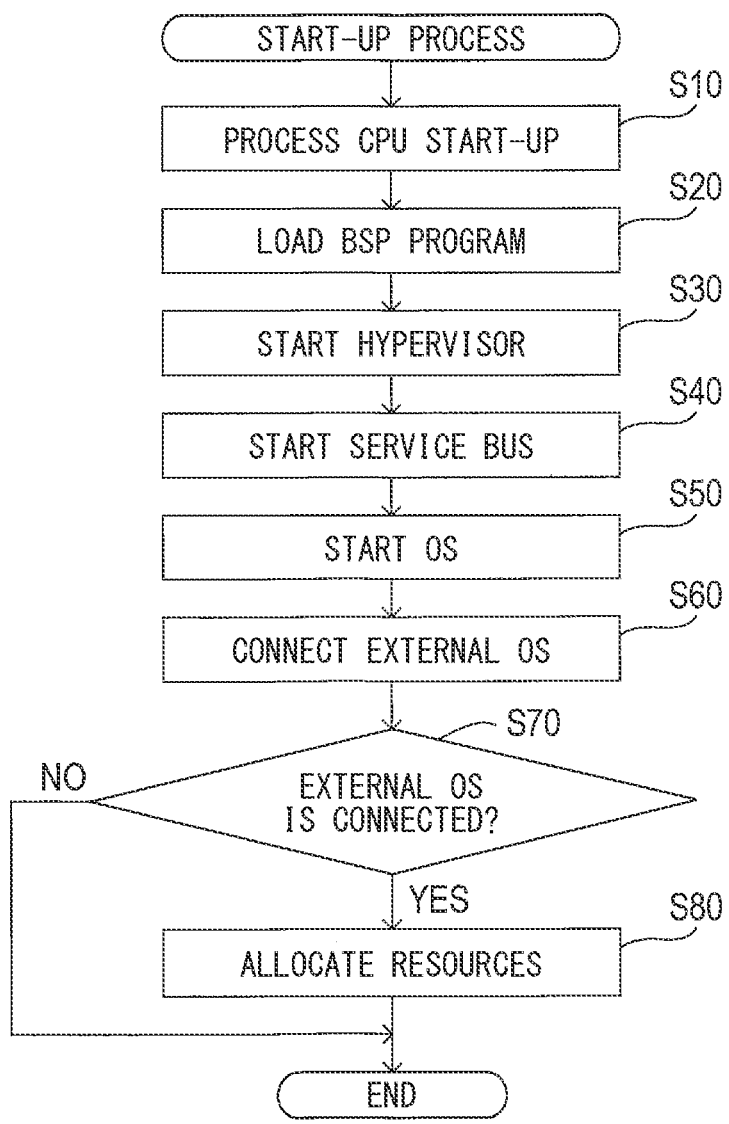
FIG. 3 is a flowchart showing a start-up process.

When the start-up process is executed, the CPU 21 of the HCU 2 first executes the start-up process of starting the CPU 21 in S10, as shown in FIG. 3. Then, when the CPU 21 starts up, the CPU 21 loads the BSP program in S20. BSP is an abbreviation for Board Support Package. The BSP program is a program necessary for executing the OS on the SoC constituting the HCU 2, and includes, for example, a program for executing the hardware initialization process.

Next, in S30, the CPU 21 starts the hypervisor 81. Further, in S40, the CPU 21 starts the service bus 82. After that, in S50, the CPU 21 starts the OS 83 and the real-time OS 84. Further, in S60, the CPU 21 executes a process for connecting an external OS (that is, OS 91) to the service bus 82.

Then, in S70, the CPU 21 determines whether or not the service bus 82 is connected to the external OS (that is, OS 91) that is external to the HCU 2. Here, if it is not connected to the external OS, the CPU 21 ends the start-up process. On the other hand, when connected to the external OS, the CPU 21 allocates resources to the external OS in S80 and ends the start-up process. Specifically, the CPU 21 sets a storage area in the RAM 23 for temporarily storing the data received from the USB module 3.

The following will describe the control by the HCU 2 regarding the center display 51, the meter display 52, the head-up display 53, the air conditioner controller display 54, and the speaker 55.

Figure 4:
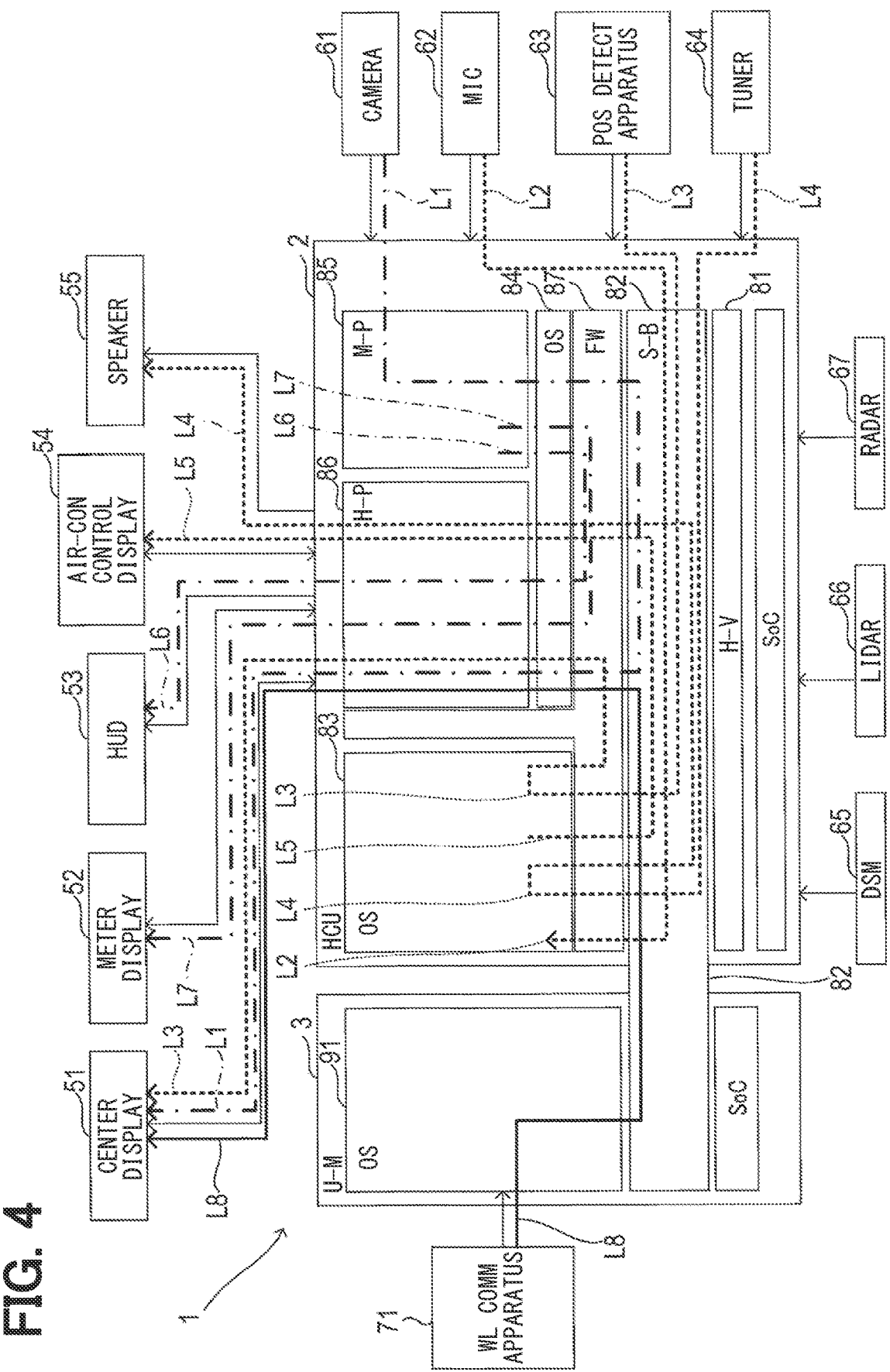
FIG. 4 is a diagram showing a data flow in the first embodiment.

As shown in FIG. 4, the data acquired by the camera 61 capturing an image is input to the meter processor unit 85. The back camera application 113 mounted on the meter processor unit 85 creates display data to be displayed on the center display 51 using the input data. Then, the back camera application 113 outputs the created display data to the HMI processor unit 86 via the service bus 82. The HMI processor unit 86 outputs the display data input from the meter processor unit 85 to the center display 51. The polygonal line L1 indicated by the alternate long and short dash line indicates the data path from the camera 61 to the center display 51.

The data indicating the speech detected by the microphone 62 is input to the OS 83. The speech recognition application 104 mounted on the OS 83 (i) performs speech recognition processing based on the input speech data, (ii) performs the necessary processing to determine the output audio to be output from the speaker 55, and (iii) outputs the data indicating the determined output speech to the HMI processor unit 86 via the service bus 82. The HMI processor unit 86 outputs the data input from the OS 83 to the speaker 55. The polygonal line L2 shown by the broken line indicates the data path from the microphone 62 to the OS 83.

The data indicating the position detected by the position detection apparatus 63 is input to the OS 83. The navigation application 103 mounted on the OS 83 creates display data to be displayed on the center display 51 based on the input position data. Then, the navigation application 103 outputs the created display data to the HMI processor unit 86 via the service bus 82. The HMI processor unit 86 outputs the display data input from the OS 83 to the center display 51. The polygonal line L3 shown by the broken line indicates the data path from the position detection apparatus 63 to the center display 51.

The data indicating the radio broadcast signal received by the tuner 64 is input to the OS 83. The radio application 101 mounted on the OS 83 creates data indicating the output sound to be output from the speaker 55 based on the input data, and outputs the created data to the HMI processor unit 86 via the service bus 82. The HMI processor unit 86 outputs the data input from the OS 83 to the speaker 55. The polygonal line L4 shown by the broken line indicates the data path from the tuner 64 to the speaker 55.

The air conditioner application 102 mounted on the OS 83 creates display data for display on the center display 51. Then, the air conditioner application 102 outputs the created display data to the HMI processor unit 86 via the service bus 82. The HMI processor unit 86 outputs the display data input from the OS 83 to the air conditioner controller display 54. The polygonal line L5 shown by the broken line indicates the data path from the OS 83 to the air conditioner controller display 54.

The head-up display application 112 mounted on the meter processor unit 85 creates display data for display on the head-up display 53. Then, the head-up display application 112 outputs the created display data to the HMI processor unit 86 via the service bus 82. The HMI processor unit 86 outputs the display data input from the meter processor unit 85 to the head-up display 53. The polygonal line L6 indicated by the alternate long and short dash line indicates the data path from the meter processor unit 85 to the head-up display 53.

The meter application 111 mounted on the meter processor unit 85 creates display data for display on the meter display 52. Then, the meter application 111 outputs the created display data to the HMI processor unit 86 via the service bus 82. The HMI processor unit 86 outputs the display data input from the meter processor unit 85 to the meter display 52. The polygonal line L7 indicated by the alternate long and short dash line indicates the data path from the meter processor unit 85 to the meter display 52.

The data received by the wireless communication apparatus 71 is input to the OS 91. The mobile device communication application 121 mounted on the OS 91 creates display data for display on the center display 51. Then, the mobile device communication application 121 outputs the created display data to the HMI processor unit 86 via the service bus 82. The HMI processor unit 86 outputs the display data input from the OS 91 to the center display 51. The polygonal line L8 shown by the solid line indicates a data path from the wireless communication apparatus 71 to the center display 51.

The vehicle control system 1 configured in this way includes the HCU 2 and the USB module 3. The HCU 2 includes the controller unit 12, the communication circuit 25, the housing 11, and the USB connector 14.

The controller unit 12 executes the OS 83 that operates the radio application 101, the air conditioner application 102, the navigation application 103, and the speech recognition application 104. The radio application 101 controls the speaker 55 mounted on the vehicle. The air conditioner application 102 controls the air conditioner controller display 54 mounted on the vehicle. The navigation application 103 controls the center display 51 mounted on the vehicle. The speech recognition application 104 controls the speaker 55 mounted on the vehicle.

The communication circuit 25 performs wired data communication with the outside of the HCU 2. The housing 11 houses the controller unit 12 and the communication circuit 25 inside. The USB connector 14 is attached to the outside of the housing 11 and is electrically connected to the communication circuit 25.

The USB module 3 includes the controller unit 32 and the communication circuit 45. The controller unit 32 executes the OS 91 that operates the mobile device communication application 121 that controls the center display 51 mounted on the vehicle. The communication circuit 45 is connected to the communication circuit 25 by wire via the USB connector 14, and performs data communication with the communication circuit 25.

In this way, in the vehicle control system 1, the USB module 3 can be connected to the HCU 2 by wire via the USB connector 14. As a result, the vehicle control system 1 can perform data communication between the HCU 2 and the USB module 3 to control the devices mounted on the vehicle. The application that operates on the HCU 2 (hereinafter, a first application) and the application that operates on the USB module 3 (hereinafter, a second application) are different from each other. Therefore, there is little data used by being exchanged with each other between the first application and the second application. Therefore, the vehicle control system 1 can suppress an increase in the amount of data transmitted/received between the HCU 2 and the USB module 3. As a result, the vehicle control system 1 connects the HCU 2 and the USB module 3 by using wired communication having lower communication performance than the communication by the bus lines 26 and 46 inside the controller units 12 and 32. This makes it possible to control the devices mounted on the vehicle.

Then, in the vehicle control system 1, the hardware of the USB module 3 can be replaced by replacing the USB module 3 and connecting a new USB module 3 to the HCU 2. Therefore, the vehicle control system 1 can improve the performance of the vehicle control system 1 as a whole by connecting the USB module 3 having higher performance than before the replacement to the HCU 2.

Further, in the vehicle control system 1, the USB module 3 can be connected to the HCU 2 via the USB connector 14 attached to the outside of the housing 11 of the HCU 2. As a result, the vehicle control system 1 need not perform replacement work of connecting the HCU 2 and the USB module 3 by opening a part of the housing 11 of the HCU 2 and accommodating the new USB module 3 inside the housing 11 of the HCU 2. The HCU 2 and the USB module 3 can be connected by a simple method of connecting the USB module 3 to the USB connector 14.

From the above, the vehicle control system 1 can easily improve the performance of the vehicle control system 1.

Further, the controller unit 32 has higher processing performance than the controller unit 12. Suppose that the hardware installed in the HCU 2 and the USB module 3 is the latest at the time of shipment of the vehicle. Even in such cases, when the USB module 3 is replaced after the vehicle is shipped, it is replaced with hardware having higher processing performance than when the vehicle is shipped. Therefore, even if the hardware mounted on the HCU 2 and the USB module 3 is the latest at the time of shipment of the vehicle, the vehicle control system 1 can improve the performance by replacing the USB module 3 after the vehicle is shipped.

The software of HCU 2 can also be updated by OTA or the like. OTA is an abbreviation for Over The Air.

In the embodiment described above, the HCU 2 corresponds to a first electronic control apparatus, and the USB module 3 corresponds to a second electronic control apparatus.

Further, the controller unit 12 corresponds to a first controller or a first controller unit, the communication circuit 25 corresponds to a first communication unit, and the USB connector 14 corresponds to a communication connector.

Further, the radio application 101, the air conditioner application 102, the navigation application 103, and the speech recognition application 104 each correspond to a first application, and the OS 83 corresponds to a first operating system.

Further, the controller unit 32 corresponds to a second controller or a first controller unit, and the communication circuit 45 corresponds to a second communication unit.

Further, the mobile device communication application 121 corresponds to a second application, and the OS 91 corresponds to a second operating system.

Second Embodiment

Hereinafter, a second embodiment of the present disclosure will be described with reference to the drawings. Note that in the second embodiment, portions different from the first embodiment will be described. The same reference signs are given to common elements.

Figure 5:
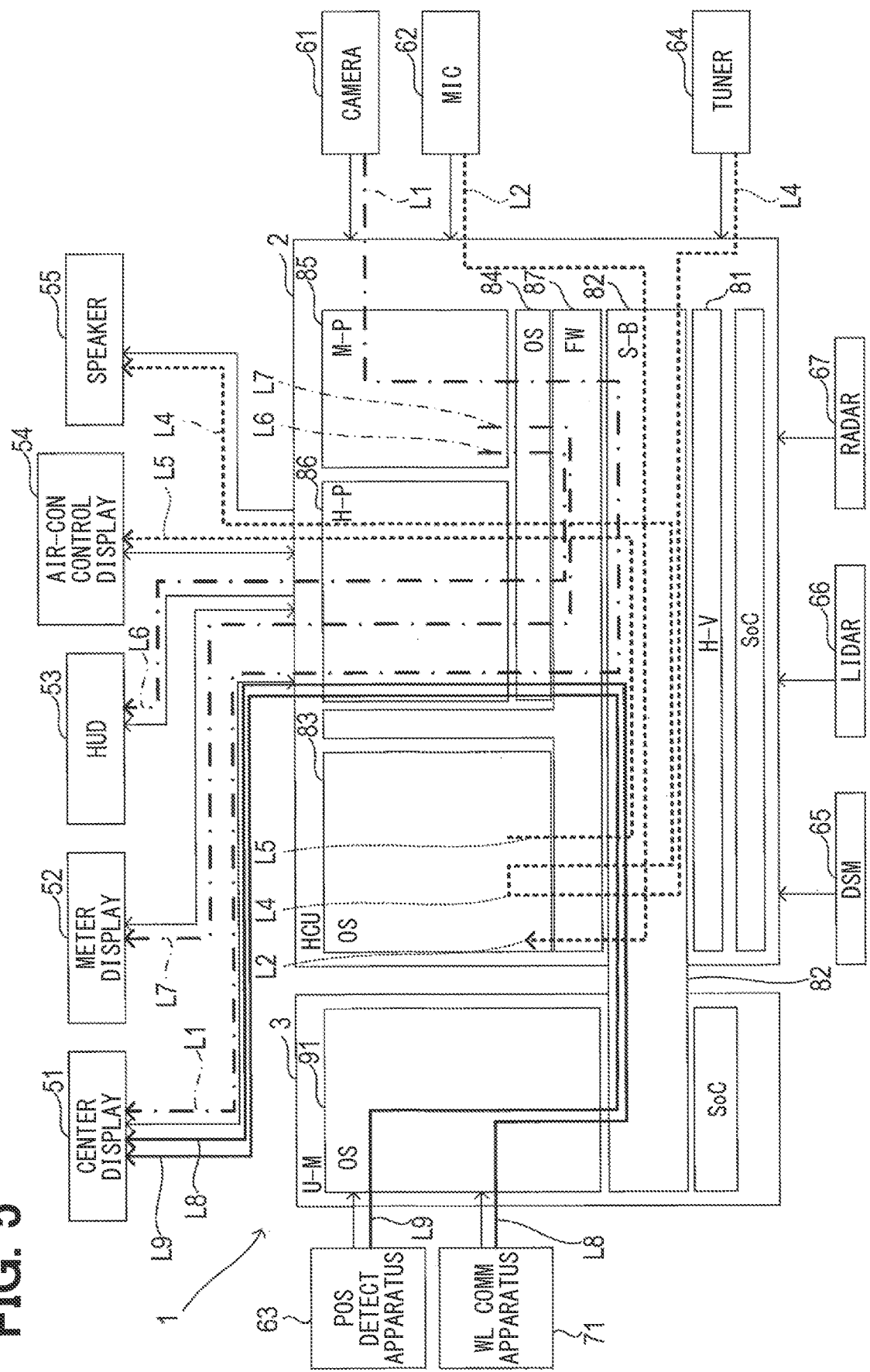
FIG. 5 is a diagram showing a data flow in the second embodiment.

As shown in FIG. 5, the vehicle control system 1 of the second embodiment is different from the first embodiment in that the position detection apparatus 63 is not connected to the HCU 2 but is connected to the USB module 3.

The data indicating the position detected by the position detection apparatus 63 is input to the OS 91. The navigation application installed in the OS 91 creates display data to be displayed on the center display 51 based on the input position data. Then, the navigation application outputs the created display data to the HMI processor unit 86 via the service bus 82. The HMI processor unit 86 outputs the display data input from the OS 91 to the center display 51. The polygonal line L9 shown by the solid line indicates a data path from the position detection apparatus 63 to the center display 51 via the OS 91.

Third Embodiment

Hereinafter, a third embodiment of the present disclosure will be described with reference to the drawings. Note that in the third embodiment, portions different from the second embodiment will be described. The same reference signs are given to common elements.

Figure 6:
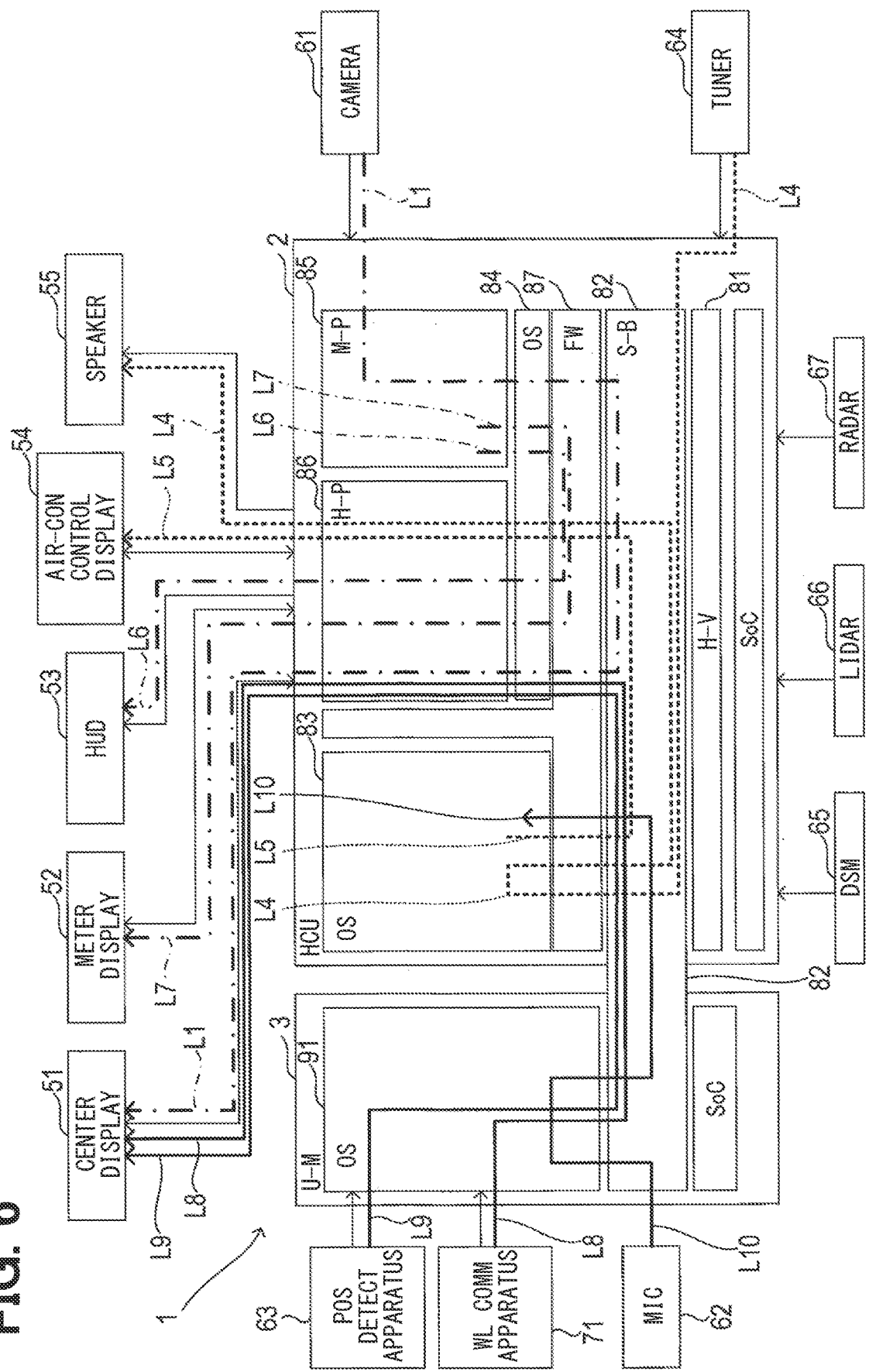
FIG. 6 is a diagram showing a data flow in the third embodiment.

As shown in FIG. 6, the vehicle control system 1 of the third embodiment is different from the second embodiment in that the microphone 62 is not connected to the HCU 2 but is connected to the USB module 3.

The data indicating the speech detected by the microphone 62 is input to the OS 91. The speech recognition application installed in the OS 91 determines the output speech to be output from the speaker 55 based on the input speech data, and outputs the data indicating the determined output speech to the OS 83 via the service bus 82. The OS 83 outputs the data input from the OS 91 to the HMI processor unit 86. The HMI processor unit 86 outputs the data input from the OS 83 to the speaker 55. The polygonal line L10 shown by the solid line indicates a data path from the microphone 62 to the OS 83 via the OS 91.

Fourth Embodiment

Hereinafter, a fourth embodiment of the present disclosure will be described with reference to the drawings. Note that in the fourth embodiment, portions different from the first embodiment will be described. The same reference signs are given to common elements.

Figure 7:
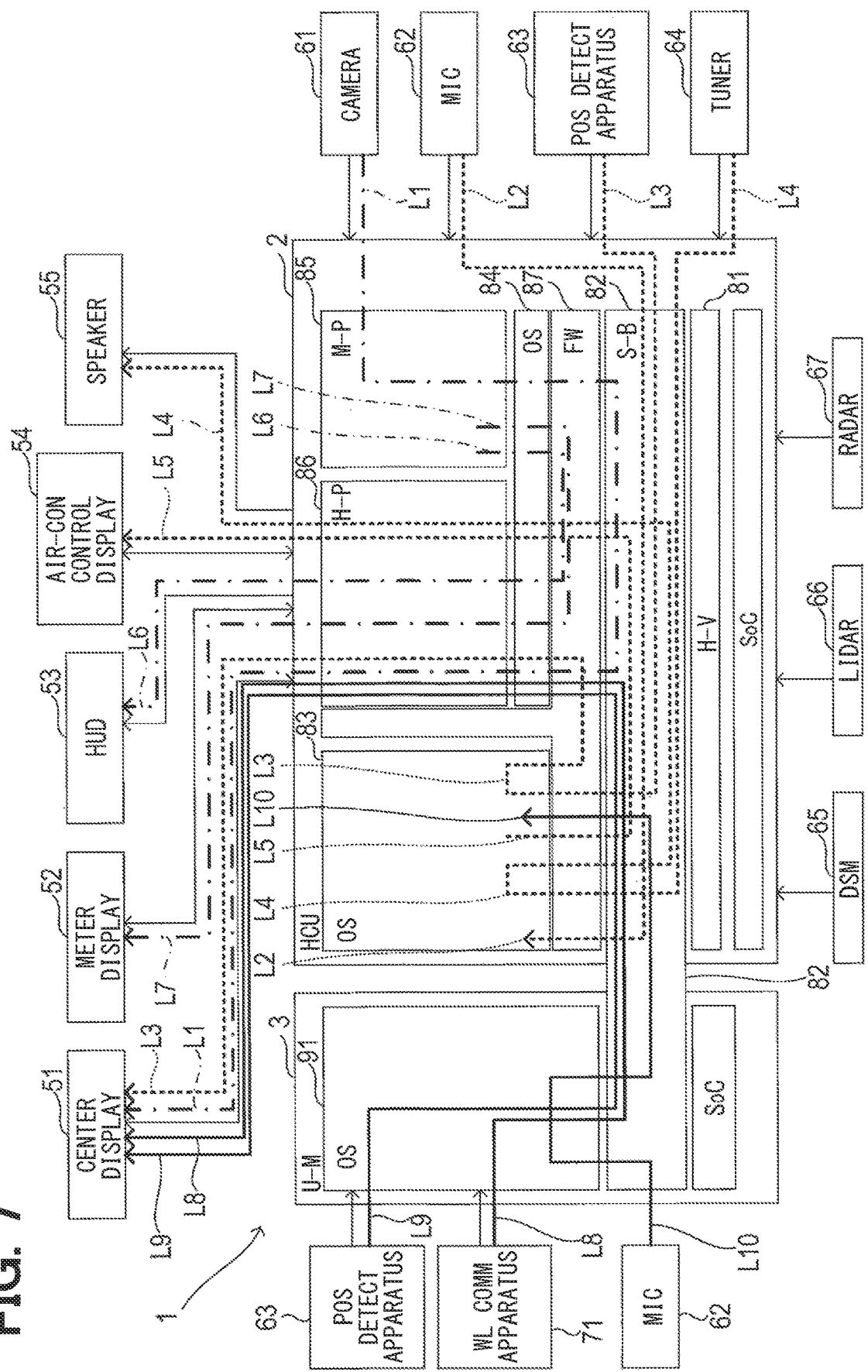
FIG. 7 is a diagram showing a data flow in the fourth embodiment.

As shown in FIG. 7, the vehicle control system 1 of the fourth embodiment is different from the first embodiment in that the position detection apparatus 63 and the microphone 62 are also connected to the USB module 3.

The data indicating the position detected by the position detection apparatus 63 is input to the OS 91. The navigation application installed in the OS 91 creates display data to be displayed on the center display 51 based on the input position data. The navigation application installed in the OS 91 can display map data with higher accuracy than the navigation application installed in the OS 83.

Then, the navigation application outputs the created display data to the HMI processor unit 86 via the service bus 82. The HMI processor unit 86 outputs the display data input from the OS 91 to the center display 51. The polygonal line L9 shown by a solid line indicates a data path from the position detection apparatus 63 to the center display 51 through the OS 91.

The data indicating the speech detected by the microphone 62 is input to the OS 91. The speech recognition application installed in the OS 91 determines the output speech to be output from the speaker 55 based on the input speech data, and outputs the data indicating the determined output speech to the OS 83 via the service bus 82. Note that the speech recognition application installed in the OS 91 has higher speech recognition accuracy than the speech recognition application installed in the OS 83.

Then, the OS 83 outputs the data input from the OS 91 to the HMI processor unit 86. The HMI processor unit 86 outputs the data input from S83 to the speaker 55. The polygonal line L10 shown by the solid line indicates a data path from the microphone 62 to the OS 83 through the OS 91.

Fifth Embodiment

Hereinafter, a fifth embodiment of the present disclosure will be described with reference to the drawings. Note that in the fifth embodiment, portions different from the first embodiment will be described. The same reference signs are given to common elements.

Figure 8:
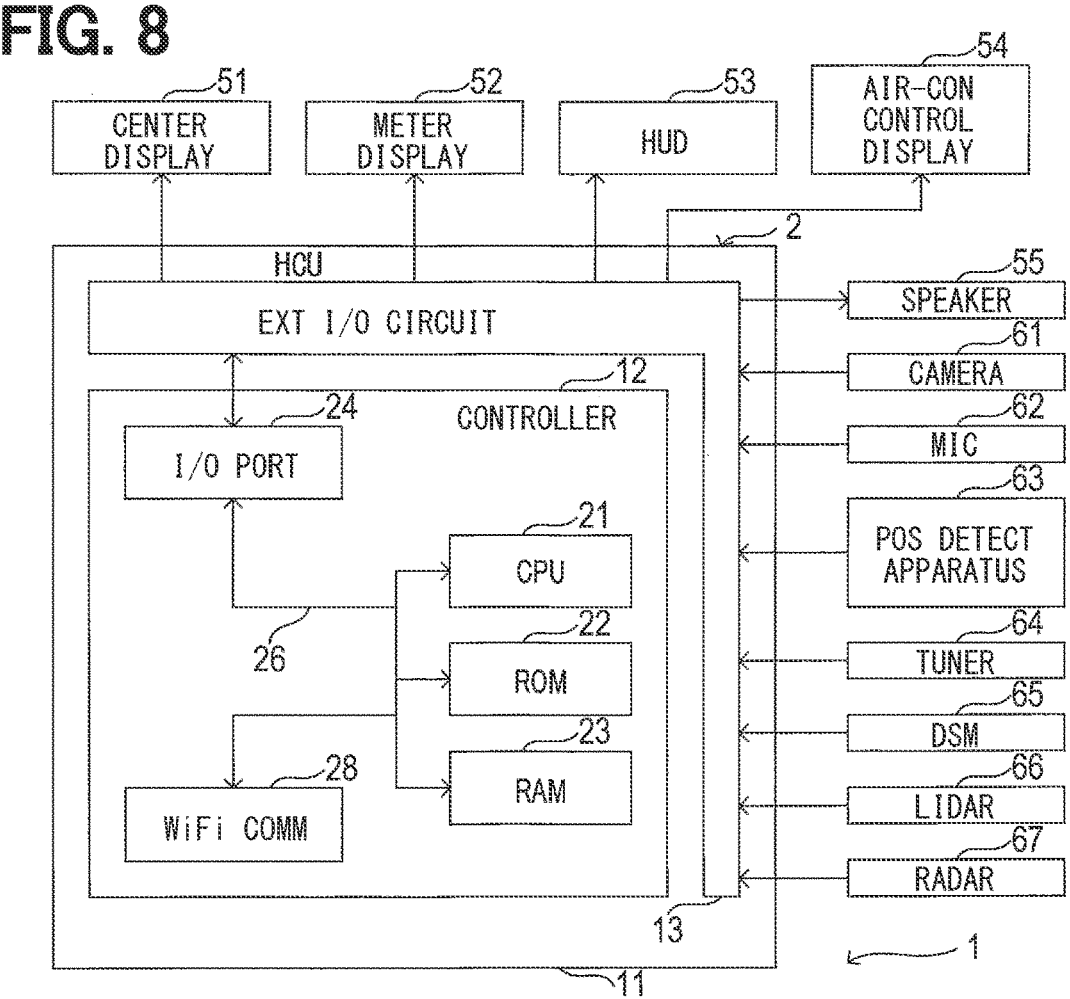
FIG. 8 is a block diagram showing a configuration of a vehicle control system according to a fifth embodiment.
Figure 8:
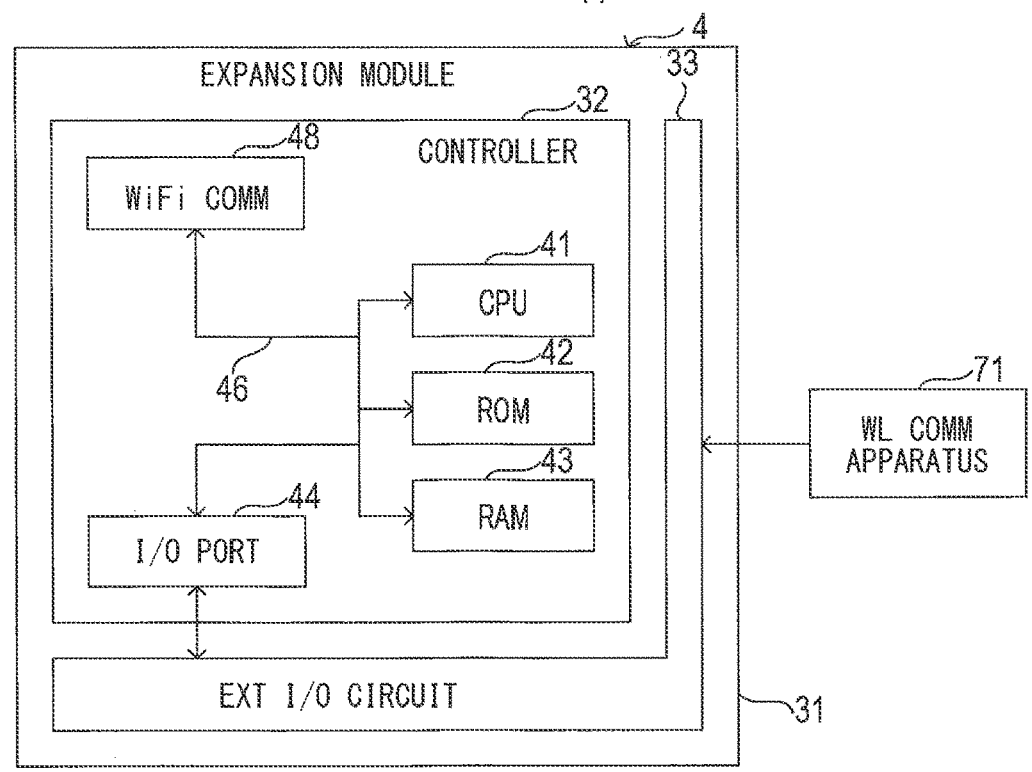

As shown in FIG. 8, the vehicle control system 1 of the fifth embodiment is different from the first embodiment in that the expansion module 4 is provided instead of the USB module 3.

The HCU 2 of the fifth embodiment is different from the first embodiment in that the USB connector 14 is omitted and that a Wi-Fi communication unit 28 is provided instead of the communication circuit 25. The Wi-Fi communication unit 28, which may also be referred to as a Wi-Fi communication circuit 28, performs short-range wireless communication by, as a wireless communication link, a method compliant with the Wi-Fi standard.

The expansion module 4 of the fifth embodiment is a semiconductor integrated circuit composed of, for example, an SoC. The expansion module 4 includes a housing 31, a controller unit 32, and an external input/output circuit 33 for performing signal input/output between the outside of the expansion module 4 and the controller unit 32.

The controller unit 32 of the fifth embodiment includes a CPU 41, a ROM 42, a RAM 43, an input/output port 44, a Wi-Fi communication unit 48, and a bus line 46 that connects the foregoing components to each other. The Wi-Fi communication unit 48, which may also be referred to as a Wi-Fi communication circuit 48, performs short-range wireless communication with the Wi-Fi communication unit 28 by a method compliant with the Wi-Fi standard.

Figure 9:
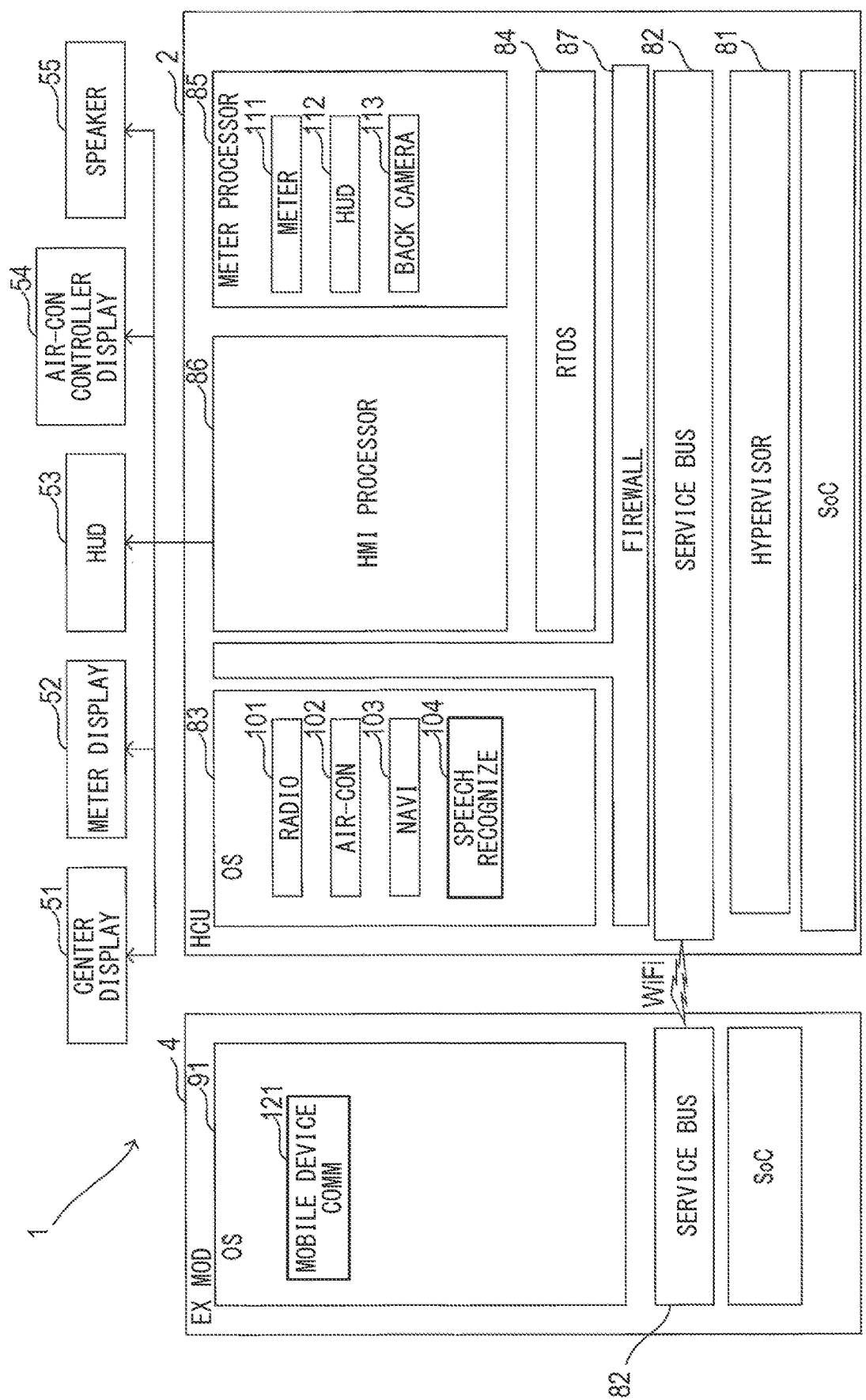
FIG. 9 is a functional block diagram showing a functional configuration of the vehicle control system according to the fifth embodiment.

As shown in FIG. 9, the HCU 2 includes a hypervisor 81, a service bus 82, an OS 83, a real-time OS 84, a meter processor unit 85, an HMI processor unit 86, and a firewall 87.

The hypervisor 81, the OS 83, the real-time OS 84, the meter processor unit 85, the HMI processor unit 86, and the firewall 87 of the fifth embodiment are the same as those of the first embodiment. The service bus 82 of the fifth embodiment is different from the first embodiment.

The service bus 82 of the fifth embodiment can exchange data so that the HCU 2 and the expansion module 4 that communicate via the Wi-Fi communication units 28 and 48 can exchange data as if the HCU 2 and the expansion module 4 were one device.

The expansion module 4 includes an OS 91, like the USB module 3.

Note that a security authentication function is provided on the expansion module 4 side in order for the HCU 2 to distinguish between the connection of a mobile terminal and the connection of the expansion module 4 on the HCU 2 side.

The start-up process of the fifth embodiment is the same as that of the first embodiment except that the USB module 3 is changed to the expansion module 4. In the first embodiment, as described above, when the power supply voltage is applied to the HCU 2, the power supply voltage is also applied to the USB module 3 via the USB connector 14. As a result, the CPU 41 of the USB module 3 starts, and the CPU 41 starts the OS 91. On the other hand, in the fifth embodiment, when the power supply voltage is separately applied to the expansion module 4, the CPU 41 of the expansion module 4 is started, and the CPU 41 starts the OS 91.

The vehicle control system 1 configured in this way includes the HCU 2 and the expansion module 4. The HCU 2 includes the controller unit 12, the Wi-Fi communication unit 28, and the housing 11.

The controller unit 12 executes the OS 83 that operates the radio application 101, the air conditioner application 102, the navigation application 103, and the speech recognition application 104.

The Wi-Fi communication unit 28 wirelessly performs data communication with the outside of the HCU 2. The housing 11 houses the controller unit 12 and the Wi-Fi communication unit 28 inside.

The expansion module 4 includes the controller unit 32 and the Wi-Fi communication unit 48. The controller unit 32 executes the OS 91 that operates the mobile device communication application 121 that controls the center display 51 mounted on the vehicle. The Wi-Fi communication unit 48 wirelessly performs data communication with the Wi-Fi communication unit 28.

In this way, the vehicle control system 1 controls the devices mounted on the vehicle by causing the Wi-Fi communication unit 28 and the Wi-Fi communication unit 48 to perform data communication between the HCU 2 and the expansion module 4. The application that operates on the HCU 2 (hereinafter, the first application) and the application that operates on the expansion module 4 (hereinafter, the second application) are different from each other. Therefore, there is little data used by being exchanged with each other between the first application and the second application. Therefore, the vehicle control system 1 can suppress an increase in the amount of data transmitted and received between the HCU 2 and the expansion module 4. As a result, the vehicle control system 1 connects the HCU 2 and the expansion module 4 by using communication having lower communication performance than the communication by the bus lines 26 and 46 inside the controller units 12 and 32. This makes it possible to control the devices mounted on the vehicle.

Then, in the vehicle control system 1, the expansion module 4 may be replaced, and the new expansion module 4 may be connected to the HCU 2 by communication. As a result, the hardware of the expansion module 4 can be replaced. Therefore, the vehicle control system 1 can improve the performance of the vehicle control system 1 as a whole by connecting the HCU 2 to the expansion module 4 having higher performance than before the replacement.

Further, in the vehicle control system 1, the expansion module 4 can be connected to the HCU 2 by communication between the Wi-Fi communication unit 28 and the Wi-Fi communication unit 48. As a result, the vehicle control system 1 need not perform replacement work of connecting the HCU 2 and the expansion module 4 by opening a part of the housing 11 of the HCU 2 and accommodating the new expansion module 4 inside the housing 11 of the HCU 2. Therefore, the vehicle control system 1 can connect the HCU 2 and the expansion module 4 by a simple method of connecting the expansion module 4 to the HCU 2 by communicating with the Wi-Fi communication unit 28 and the Wi-Fi communication unit 48.

From the above, the vehicle control system 1 can easily improve the performance of the vehicle control system 1.

In the embodiment described above, the expansion module 4 corresponds to a second electronic control apparatus, the Wi-Fi communication unit 28 corresponds to a first communication unit or circuit, and the Wi-Fi communication unit 48 corresponds to a second communication unit or circuit.

As described above, the embodiments of the present disclosure have been described, but the present disclosure is not limited to the above embodiments, and can be implemented with various modifications.

[Modification 1]

For example, the first embodiment has described an example configuration in which USB communication is performed between the HCU 2 and the USB module 3. However, the communication is not limited to USB communication, and communication may be performed by, for example, PCI-Ex.

Further, the function of one element in the above embodiment may be shared by a plurality of elements, or the function of the plurality of elements may be exerted by one element. Moreover, part of the configuration of the above-described embodiment may be omitted. At least a part of the configuration of the embodiment described above may be added to, replaced with another configuration of the embodiment described above, or the like.

The present disclosure can also be implemented, in addition to the HCU 2 and modules 3 and 4 described above, in various forms such as a system including the HCU 2 and module 3 or module 4, a program for operating a computer as the HCU 2 and module 3 or module 4, a storage medium storing this program, an apparatus performance improving method.

For reference to further explain features of the present disclosure, the description is added as follows.

There is a computer system incorporated in an automobile or the like. In human machine interface control apparatuses that control a display device installed in the cockpit of a vehicle, the operating system used in the mobile terminal (hereinafter referred to as the OS for mobile terminals) is rapidly becoming widespread. The OS for mobile terminals is often updated every year, and this update expands the functions installed in the OS for mobile terminals. For this reason, the functions of applications installed in the OS for mobile terminals are also increasing, and it is necessary to improve the performance of the hardware installed in the mobile terminals accordingly.

Detailed examination by the inventor has found an issue that it is difficult to replace the hardware of the electronic control apparatus mounted on the vehicle every year or several years after the vehicle is shipped.

It is thus desired to facilitate performance improvement of a vehicle control system after shipment of the vehicle.

An aspect of the present disclosure described herein is set forth in the following clauses.

According to an aspect of the present disclosure, a vehicle control system is provided to include a first electronic control apparatus and a second electronic control apparatus, which are mounted on a vehicle.

The first electronic control apparatus includes a first controller unit, a first communication unit, and a housing. The first controller unit is configured to execute a first operating system that operates a first application that controls a device mounted on the vehicle. The first communication unit is configured to perform data communication with an outside of the first electronic control apparatus. The housing is configured to contain the first controller unit and the first communication unit.

The second electronic control apparatus includes a second controller unit and a second communication unit. The second controller unit is configured to execute a second operating system that operates a second application that operates a second application that controls a device mounted on the vehicle. The second communication unit is configured to perform data communication with the first communication unit.

In such a configuration of the vehicle control system according to the aspect of the present disclosure, the first electronic control apparatus and the second electronic control apparatus are caused to perform data communication with each other by the first communication unit and the second communication unit. The device mounted on the vehicle can thereby be controlled. The first application that is operated in the first electronic control apparatus is different from the second application that is operated in the second electronic control apparatus. Therefore, there is little data used by being exchanged with each other between the first application and the second application. The vehicle control system according to the aspect of the present disclosure can suppress an increase in the amount of data transmitted and received between the first electronic control apparatus and the second electronic control apparatus. As a result, the vehicle control system according to the aspect of the present disclosure connects the first electronic control apparatus and the second electronic control apparatus with each other by using communication having lower communication performance than the communication by the communication bus inside each of the first controller unit and the second controller unit. This makes it possible to control a device mounted on the vehicle.

Then, in the vehicle control system according to the aspect of the present disclosure, the second electronic control apparatus may be replaced with a new second electronic control apparatus, which is to be connected to the first electronic control apparatus via communication. As a result, the hardware of the second electronic control apparatus can be replaced with the hardware of the new second electronic control apparatus. Therefore, in the vehicle control system according to the aspect of the present disclosure, a second electronic control apparatus having a performance higher than that before replacement may be connected to the first electronic control apparatus. As a result, the performance of the vehicle control system can be improved as a whole.

Further, in the vehicle control system according to the aspect of the present disclosure, the second electronic control apparatus can be connected to the first electronic control apparatus by communication between the first communication unit and the second communication unit. As a result, the vehicle control system according to the aspect of the present disclosure does not need to perform a replacement work, which needs to open a part of the housing of the first electronic control apparatus to accommodate a new second electronic control apparatus inside the housing of the first electronic control apparatus, to connect the first electronic control apparatus and the second electronic control apparatus with each other. Therefore, the vehicle control system according to the aspect of the present disclosure can connect the first electronic control apparatus and the second electronic control apparatus with each other by a simple method, which only connects the second electronic control apparatus with the first electronic control apparatus by communication between the first communication unit and the second communication unit.

From the above, the vehicle control system according to the aspect of the present disclosure can facilitate the performance improvement of the vehicle control system.

What is claimed is:

1. A vehicle control system comprising:
a first electronic control apparatus and a second electronic control apparatus, which are mounted on a vehicle, the first electronic control apparatus comprising:
a first controller configured to execute a first operating system that operates a first application that controls a device mounted on the vehicle;
a first communication circuit configured to perform data communication with an outside of the first electronic control apparatus; and
a housing configured to contain the first controller and the first communication circuit, the second electronic control apparatus comprising:
a second controller configured to execute a second operating system that operates a second application that controls a device mounted on the vehicle; and
a second communication circuit configured to perform data communication with the first communication circuit,
wherein: the first communication circuit and the second communication circuit are communicatively connected with each other by a service bus;
the service bus is configured to bridge data between (i) an application layer and (ii) a presentation layer or a layer lower than the presentation layer to exchange data so that the first electronic control apparatus and the second electronic control apparatus can exchange the data as if they were one device;
the service bus includes a database for associating the data used in the application layer with the data used in the presentation layer or the layer lower than the presentation layer; and
the service bus performs data conversion between the application layer data and the presentation or lower layer data by referring to the database.

2. The vehicle control system according to claim 1, wherein:
the first communication circuit is configured to perform wired data communication with the outside of the first electronic control apparatus;
the first electronic control apparatus includes a communication connector attached to an outside of the housing, the communication connector being electrically connected to the first communication circuit; and
the second communication circuit is connected to the first communication circuit by wire via the communication connector to perform data communication with the first communication circuit.

3. The vehicle control system according to claim 1, wherein:
the first communication circuit and the second communication circuit are configured to wirelessly perform data communication with each other.

4. The vehicle control system according to claim 1, wherein:
the second controller provides a processing performance higher than a processing performance provided by the first controller.

5. A vehicle control system comprising:
a first electronic control apparatus mounted on a vehicle; and
a second electronic control apparatus mounted on the vehicle, wherein the first electronic control apparatus and the second electronic control apparatus are provided to be separated from each other and to be coupled to each other via a communication link, the first electronic control apparatus comprising:
a first memory configured to store a first operating system and a first application operated by the first operating system to control a device mounted on the vehicle;
a first processor connected with the first memory, the first processor being configured to execute the first operating system to operate the first application;
a first communication circuit connected with the first processor, the first communication circuit being configured to perform data communication with an outside of the first electronic control apparatus; and
a first housing configured to contain the first memory, the first processor, and the first communication circuit, inside of the first housing, the second electronic control apparatus comprising:
a second memory configured to store a second operating system and a second application operated by the second operating system to control a device mounted on the vehicle;
a second processor connected with the second memory, the second processor being configured to execute the second operating system to operate the second application;
a second communication circuit connected with the second processor, the second communication circuit being configured to perform data communication with the first communication circuit via the communication link; and
a second housing configured to contain the second memory, the second processor, and the second communication circuit, inside of the second housing, wherein:
the first memory in the first electronic control apparatus is further configured to store a service bus;
the first communication circuit and the second communication circuit are communicatively connected with each other by the service bus;
the service bus is configured to bridge data between (i) an application layer and (ii) a presentation layer or a layer lower than the presentation layer, among layers of communication functions included in the first electronic control apparatus and the second electronic control apparatus, to exchange data so that the first electronic control apparatus and the second electronic control apparatus can exchange the data as if they were one device;
the service bus includes a database for associating the data used in the application layer with the data used in the presentation layer or the layer lower than the presentation layer; and
the service bus performs data conversion between the application layer data and the presentation or lower layer data by referring to the database.

* * * * *